United States Patent [19]

Niederdellmann et al.

[11] 4,399,236

[45] Aug. 16, 1983

[54] PROCESS FOR SEPARATING POLYURETHANE HYDROLYZATES INTO POLYETHER AND DIAMINE

[75] Inventors: Georg Niederdellmann, Dormagen; Norbert Roemer, Moenchen-Gladbach; Jürgen Schenk, Dormagen; Hartmut Hetzel, Cologne; Ernst Grigat, Leverkusen, all of Fed. Rep. of Germany

[73] Assignee: Bayer Aktiengesellschaft, Leverkusen, Fed. Rep. of Germany

[21] Appl. No.: 299,418

[22] Filed: Sep. 4, 1981

[30] Foreign Application Priority Data

Sep. 13, 1980 [DE] Fed. Rep. of Germany ....... 3034680

[51] Int. Cl.³ .................... C08J 11/04; C08G 18/48
[52] U.S. Cl. ..................................................... 521/49
[58] Field of Search ......................................... 521/49

[56] References Cited

U.S. PATENT DOCUMENTS

| | | | |
|---|---|---|---|
| 4,035,314 | 7/1977 | Lohr, Jr. et al. | 260/2.3 |
| 4,051,212 | 9/1977 | Grigat et al. | 264/102 |
| 4,143,072 | 3/1979 | Hetzel et al. | 260/573 |
| 4,281,197 | 7/1981 | Oblinger | 521/49 |
| 4,282,367 | 8/1981 | Niederdellmann et al. | 260/2.3 |

FOREIGN PATENT DOCUMENTS

| | | |
|---|---|---|
| 2207379 | 8/1973 | Fed. Rep. of Germany . |
| 2854940 | 7/1980 | Fed. Rep. of Germany . |

OTHER PUBLICATIONS

Environmental Science and Technology, vol. 8, No. 2, Feb. 1974, pp. 135–138.

*Primary Examiner*—Lewis T. Jacobs
*Attorney, Agent, or Firm*—Gene Harsh; Joseph C. Gil; Lyndanne M. Whalen

[57] ABSTRACT

The present invention is directed to a process for separating polyurethane hydrolyzates, preferably polyurethane foam hydrolyzates, into substantially amine-free foamable polyethers and diamines, comprising (a) (i) briefly expanding a hot polyurethane hydrolyzate obtained in a continuous screw extruder to normal pressure or in vacuo and, without using readily volatile components (ii) spraying said hydrolyzate directly into a tubular coil evaporator which is heated to 180°–300° C. and at the end of which a pressure of from 0.1 to 20 mbar is applied and (iii) separating a hydrolyzate containing less than 1% by weight of $NH_2$ in a following cyclone from most of the diamine evaporated and all the solvent used, the diamine being separated from the solvent used in a following distillation column, optionally without any further heat input; (b) precipitating any diamine still present quantitatively in the form of its hydrochloride by introducing excess hydrogen chloride into the hydrolyzate, optionally diluted with inert solvents; and (c) the regenerated polyether obtained after removal by filtration of the precipitated amine salt being freed under reduced pressure from inert solvent and excess hydrogen chloride.

10 Claims, 2 Drawing Figures

PROCESS FOR SEPARATING POLYURETHANE HYDROLYSATES INTO POLYETHER AND DIAMINE

BACKGROUND OF THE INVENTION

There are several known processes for splitting polyurethane foam waste by hydrolytic degradation into a mixture of the starting polyol and the diamine on which the diisocyanate used in the production of the foam is based. Before it can be reused in a production process, this mixture of hydrolysates must be split up into the polyol component and the diamine component.

A commercially workable separation process should be economic, low on investment costs and able to recover the starting materials in a form in which they can be reused without any need for expensive purification. Relative to the difficult and particularly sensitive flexible polyurethane foam formulations, this applies in particular to the quality of polyether polyols which are to be returned to the foaming process after recovery from hydrolysates.

To date, distillation and liquid extraction processes in various modifications have mainly been used for separation of the mixture of hydrolysates. It is possible by distillation to recover the diamine components in a high yield and in a highly pure form. However, the polyether which accumulates as distillation residue cannot be used in its existing form for direct refoaming (*Environmental Science and Technology*, Vol. 8, No. 2, February, 1974, page 138).

In the liquid extraction process, as described for example in German Auslegeschrift No. 2,207,379, the hydrolysate is taken up in toluene or another organic solvent and the diamine is extracted with dilute aqueous hydrochloric acid. The limited solubility of the diamine hydrochloride necessitates a considerable volume of dilute acid which must be removed from the extract by distillation. In addition, the stabilizers and emulsifiers used in the foam production process seriously complicate separation of the organic and aqueous phases.

U.S. Pat. No. 4,035,314 describes the recovery of polyurethane starting materials by the hydrolysis of composite plastics materials of the type used in motor vehicles. After the polyurethane hydrolysate (consisting essentially of polytetrahyrofuran and diamine) has been separated off from the nonhydrolyzable plastics by means of an organic solvent, hydrogen chloride gas is introduced into the hydrolysate solution until no more amine hydrochloride precipitates. The amine hydrochloride is filtered off and the solvent and excess hydrogen chloride is distilled off, to leave polytetrahydrofuran ether regenerate. The regenerate can then be reacted with tolylene diisocyanate to form a prepolymer which, blended with pure prepolymer, may be hardened with 4,4'-methylene dianiline to form an elastomer. $C_2$-/$C_3$-polyethers used for the production of foams cannot be quantitatively separated from the diamine in accordance with U.S. Pat. No. 4,035,314. $C_2$-/$C_3$-regenerated polyethers which cannot be used for foaming are obtained.

German Offenlegungsschrift No. 2,854,940 describes a separation process which gives satisfactorily foamable, substantially amine-free $C_2$-/$C_3$-regenerated polyethers and which is characterized in that precipitation of the amine hydrochloride is carried out in several steps. In each step, the precipitated amine salt is separated from the reaction solution before any more hydrogen chloride is introduced and the amine hydrochloride is only quantitatively precipitated using excess hydrogen chloride when the amine group content of the polyether is below 1.0% by weight. It is possible in this way to effectively suppress the formation of troublesome quantities of polyethersoluble amine dihydrochloride which is observed where relatively high concentrations of amine are present, as is the case, for example, when the process according to U.S. Pat. No. 4,035,314 is applied to a polyurethane foam hydrolysate. German Offenlegungsschrift No. 2,854,940 naturally requires exact quantitative control of the amount of HCl introduced into the hydrolysate solution and analytical control of the amine content in the individual stages of the process.

The object of the present invention is to provide an economic and operationally reliable process which enables polyurethane hydrolysates to be separated into refoamable, substantially amine-free polyethers and diamines without the need to apply elaborate analytical control measures.

DESCRIPTION OF THE INVENTION

Figure 1:
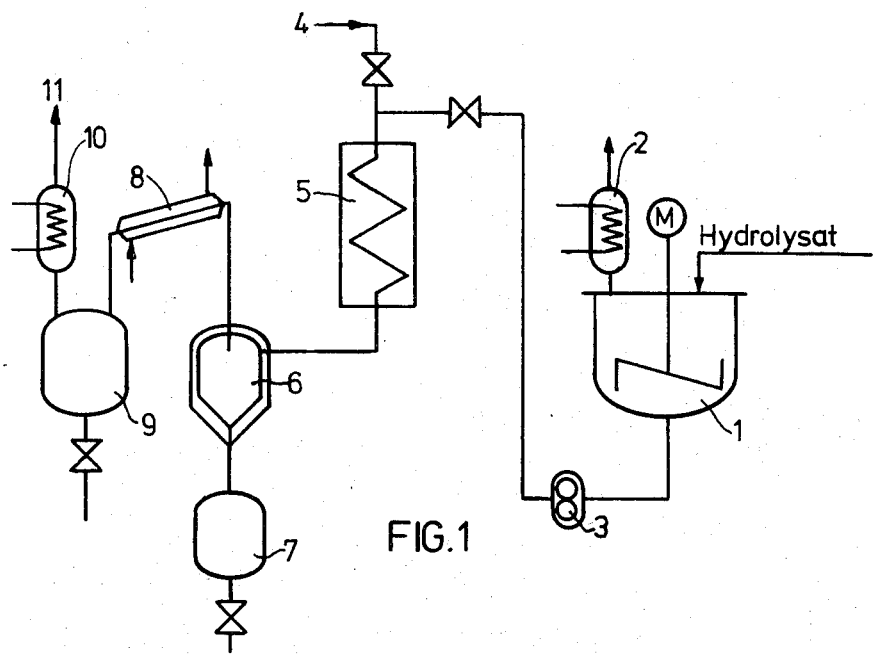
FIGS. 1 and 2 schematically illustrate two embodiments of apparatuses useful according to the present invention.

According to the invention, this object is achieved by a process wherein the hot hydrolysate, which accumulates with temperatures of about 200° to 250° C. in the hydrolysis of polyurethane waste, is sprayed directly (i.e., without using readily volatile components, such as steam) but preferably in the presence of from 1 to 15% by weight and preferably 3 to 6% by weight of a high-boiling solvent into a tubular coil evaporator. The boiling point of the high-boiling solvent is from 50° C. to 150° C. and preferably from 80° C. to 120° C. below the boiling point of the diamine to be eliminated by evaporation. The vapor pressure of the high-boiling solvent at the condensation temperature of the diamine to be eliminated by evaporation does not exceed 10 times and, preferably twice, the operating pressure required in the evaporation unit. The tubular coil evaporator is heated to 180°–300° C. and preferably to 200°–250° C. under pressures of from 0.1 to 20 mbars, whereby most of the diamine evaporates and the amine group content of the hydrolysate polyether falls below 1% by weight. The amine hydrochloride may then be quantitatively precipitated in a single stage by the introduction of excess hydrogen chloride. Refoamable polyethers, preferably $C_2$- and/or $C_3$-polyethers, are obtained.

Accordingly, the present invention provides an improved process for the separation of polyurethane hydrolysates, preferably polyurethane foam hydrolysates, into substantially anine-free, foamable polyethers and diamines, characterized in that (1) the hot polyurethane hydrolysate obtained in conventional manner in a continuous screw extruder is for a short time expanded to normal pressure or treated in vacuo, enabling excess steam and carbon dioxide to escape, and, without using readily volatile components, (but optionally in the presence of from 1 to 15% by weight, preferably 3 to 6% by weight, of a high-boiling solvent, of which the boiling point is 50° to 150° C. and preferably 80° to 120° C. below the boiling point of the diamine to be eliminated by evaporation and of which the vapor pressure at the condensation temperature of the diamine to be eliminated by evaporation does not exceed 10 times and, preferably twice, the operating pressure required in the evaporation unit), is sprayed directly and preferably continuously into a tubular coil evaporator which is heated to 180°–300° C. and preferably to 200°–250° C. and at the end of which a pressure of from 0.1 to 20 mbar, preferably 1 to 10 mbar, is applied and a hydrolysate containing less than 1% by weight of $NH_2$ is separated in a following cyclone from most of the diamine evaporated and all the solvent used, the diamine being separated from the solvent used in a following distillation column, optionally without any further heat input;

(2) any diamine still present is quantitatively precipitated in the form of its hydrochloride by introducing excess hydrogen chloride into the hydrolysate containing less than 1% by weight of $NH_2$ and optionally diluted with inert solvents; and (3) the regenerated polyether obtained after removal by filtration of the precipitated amine salt is freed under reduced pressure from inert solvent and excess hydrogen chloride.

Any polyether urethanes in homogeneous or preferably foamed form, may be used as the polyurethane starting materials. The greatest economic and quantitative significance is attributed to those ethers which may be linear or branched chain which are obtained in pure form by the polymerization of propylene oxide with preferably dihydric or polyhydric glycols or amines ($C_3$-ethers) or in copolymer form, for example, with ethylene oxide ($C_2$-/$C_3$-ethers). With regenerated polyethers such as these, it is essential to remove most of the amine from the hydrolysate in cases where the polyethers are to be reused for foam production. However, the process may also be applied to polyethers based on polytetrahydrofuran.

The diamines isolated include, in particular, the isomeric tolylene diamines. However, diamines of the diphenyl methane-2,4'- and/or -4,4'-series (including their alkyl derivatives) and 1,5-naphthylene diamine are also possible products of the process. The isolation of aliphatic diamines, such as 1,6-hexane diamine, 4,4'-dicyclohexyl methane diamine or isophorone diamine, although possible, is less interesting due to their relatively limited use in the form of the corresponding diisocyanates.

Polyurethane hydrolysates may be recovered in known manner. Hydrolysis is preferably carried out in accordance with German Offenlegungsschrift No. 2,442,387, i.e., in a continuous screw extruder at from 180° C. to 270° C. and preferably at from 200° C. to 250° C. The hot polyurethane hydrolysate obtained is briefly expanded, preferably continuously, to normal pressure or in a slight vacuum, steam and highly volatile constituents being removed. The still hot hydrolysate mixture is then sprayed directly and preferably continuously into the tubular coil evaporator which is heated to around 180°–300° C. and preferably to 200°–250° C. and at the end of which a pressure of from about 0.1 to 20 mbar and preferably from 1 to 10 mbar is applied. The polyether hydrolysate containing less than 1% by weight of $NH_2$ is separated from most of the diamine evaporated in a following cyclone.

The use of from 1 to 15 % by weight and preferably from 3 to 6% by weight of a high-boiling solvent, of which the boiling point is 50° to 150° C. and preferably 80° to 120° C. below the boiling point of the diamine to be eliminated by evaporation and of which the vapor pressure at the condensation temperature of the diamine to be evaporated does not exceed 10 times and, preferably twice, the operating pressure required in the evaporation unit, together with the polyurethane hydrolysate in the tubular coil evaporator affords a distinct advantage in regard to further reduction of the $NH_2$-content of the regenerated polyether in comparison with tubular coil evaporation carried out in the absence of high-boiling solvents of the type in question. An amine content as low as this is of considerable advantage to the outcome of the single-stage precipitation with HCl in the second stage of the process.

Suitable high-boiling solvents for the process according to the invention include, for example, aniline, decalin, benzyl alcohol, o-dichlorobenzene and low molecular weight, straight-chain or branched chain glycols optionally interrupted by heteroatoms. Particularly preferred solvents are ethylene glycol, 1,2-propylene glycol, 1,3-trimethylene glycol, 1,3-butane diol, 1,4-butane diol, diethylene glycol and aniline. Where these high-boiling solvents are used in the process, they distill off overhead in the cyclone with the diamine in the vapor phase during the cyclone separation process (at from 200° to 250° C.) and they are continuously separated from the diamine above the melting point thereof in a following distillation column, optionally without any further heat input.

The tubular coil evaporators used in the first stage of the process according to the invention are known as suitable apparatus for concentrating solutions of a solid by evaporation and for removing relatively volatile constituents from mixtures of substances (CIT 42, 1970, pages 349–354; German Auslegeschrift No. 1,667,051 and German Auslegeschrift No. 1,921,045). They consist of a coiled, descending tube which is designed to be heated in sections and into which the liquid starting materials are introduced from above. A two-phase flow is generated at the entrance to the tubular coil evaporator, the gas phase being formed by flash evaporation behind a constriction. Due to the high rate of flow of the gas phase, a turbulent, thin-layer annular flow of the product mixture is created under the effect of centrifugal forces in the coiled tube, the liquid flowing along the wall of the tube and the gas flowing in the interior of the tube. Under the effect of the circular stream which additionally flows transversely thereof between the wall of the tube and the surface of the liquid, intensive heat exchange takes place between the heated wall of the tube, the liquid and the gas, being accompanied by an intensive exchange of material between the liquid and the gas phase. Gas flow rates up to just below the speed of sound can occur at the outlet end of the tubular coil evaporator.

In conventional processes for removing readily volatile constituents, for example, solvents or residual monomers, by means of a tubular coil evaporator, a relatively large quantity of readily volatile constituents has to be present in the product mixtures in order to generate the gas flow required for the completion of the process.

Accordingly, German Offenlegungsschrift No. 2,719,968, which is concerned with the problem of removing residual constituents from a liquid polymer by means of a tubular coil evaporator, proposes using 10 to 90% by weight of a foreign vapor, preferably steam, and/or an inert gas, preferably nitrogen, at pressures of from 50 mbar to 1 bar. German Offenlegungsschrift No.

2,755,089 describes a process for freeing polyethers from troublesome secondary products, particularly low molecular weight glycols and strong-smelling substances, by means of a tubular coil evaporator, again the use of 1 to 20% by weight of steam being mentioned as the crucial feature.

However, the separation of diamines from polyurethane hydrolysates in a tubular coil evaporator using steam or other carrier gas has proved to be unsatisfactory because the vacuum required for removing the high-boiling diamines by evaporation cannot be generated without considerable technical outlay (for example, the use of brine-cooled condensers for the steam) in the presence of readily volatile foreign components. In addition, the tendency of the diamine towards sublimation, particularly, in the case of the preferred tolylene diamine, gave rise to disturbances attributable to blocked vacuum pipes (cf. Example 2). It was completely surprising on the basis of existing knowledge to find that most of the substantially involatile diamine may readily be separated from a polyurethane hyrolysate and condensed free from sublimation above the melting point by means of a tubular coil evaporator without any need to use readily volatile components. The low-amine hydrolysate which accumulates (residual $NH_2$ content less than 1% by weight) may be subjected to amine hydrochloride precipitation in known manner and directly yields (by signal-stage precipitation) a substantially amine-free, refoamable polyether.

In addition to the fact that it is easier to handle on a commercial scale in comparison with the process according to German Offenlegungsschrift No. 2,854,940, the process according to the invention, which may, of course, also be applied to $C_4$-polyethers, also has the following economic advantages:

(1) the heat inherent in the hydrolysate from the preceding splitting process is largely used for separating most of the diamine in the tubular coil evaporator, with the result that there is virtually no need to apply any additional evaporation energy;

(2) the diamine separated off in the tubular coil evaporator accumulates in the form of the free base and may be directly returned to the phosgenation process, i.e., it may be reused for the production of diisocyanates;

(3) because most of the diamine is separated off in advance, the quantity of hydrogen chloride required for precipitating the amine hydrochloride is reduced by 60 to 95%, depending on the composition of the hydrolysates, with corresponding savings of alkali or alkaline earth hydroxide or oxide for recovering the free base from the amine salt and correspondingly reduced environmental pollution by alkali or alkaline earth salts in the process.

On the other hand, it had been assumed from the prior art, as represented in particular by the teaching according to German Offenlegungsschrift No. 2,755,089, that if high-boiling solvents were used as the source of the carrier gas, troublesome residues of the solvents would remain in the polyether. Accordingly, it was extremely surprising and unexpected to find that, in the presence of the less volatile diamines, the high-boiling solvent used is quantitatively separated from the crude polyether, accompanied by a distinct increase in the amount of diamine eliminated by evaporation. This variant of the process is also free from troublesome sublimation of the diamine.

The crude polyether hydrolysate containing less than 1% of $NH_2$ is further treated by the introduction of hydrogen chloride gas in the second stage of the process according to the invention.

In principle, the hydrogen chloride may be directly introduced into the crude hydrolysate containing less than 1% of $NH_2$. However, it is of greater advantage to dilute the hydrolysate beforehand with approximately the same quantity by weight of an inert organic solvent, for example, petroleum ether, cyclohexane, methylene chloride, benzene, toluene, xylene or chlorobenzene, etc. Toluene is a particularly suitable diluent. The working temperature may be virtually anywhere between room temperature and the boiling point of the diluent. A working temperature in the range from 70° C. to 90° C. is particularly suitable for the purpose of obtaining a readily filterable amine salt solution. Removal of the amine salt precipitated by filtration and the removal of inert solvent (for example, toluene) and any excess hydrogen chloride from the regeneate polyether are carried out in known manner under reduced pressure.

The process according to the invention is further illustrated by the following Examples.

The evaporation apparatus used in accordance with the invention is diagrammatically illustrated in FIG. 1.

Figure 2:
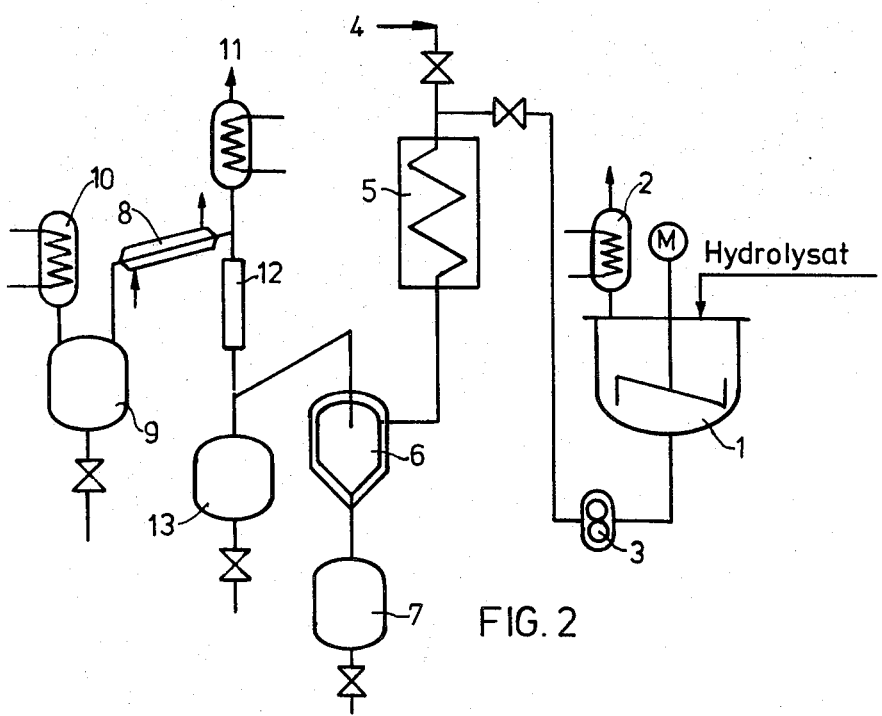

FIG. 2 shows the apparatus where high-boiling solvents are used. The coiled tube used was 12 meters long and had an internal diameter of 18 mm.

EXAMPLES

EXAMPLE 1

(Process according to the invention without highboiling solvent)

Size-reduced waste of a standard commercial grade flexible polyurethane foam based on polyether [a trimethylol propane-started trifunctional copolyether produced with propylene oxide and then with ethylene oxide (approximately 15% by weight) and having an OH-number of 33to 37] and tolylene diisocyanate were continuously hydrolyzed in a screw extruder (Werner & Pfleiderer type ZDS-KG 90) in accordance with German Offenlegungsschrift No. 2,442,387 (throughput 40 kg/h). The hydrolysate which leaves the screw extruder at a temperature of 209° C. and an amine content of 4.9% $NH_2$ was expanded to approximately 500 mbar through a buffer vessel (1) equipped with a stirrer (M), excess steam and carbon dioxide being able to escape through a vent (2), and continuously delivered by means of a pump (3) to a tubular coil evaporator (5) which had been heated to 230° C. and to the end of which a vacuum of 7 mbar was applied. Most of the tolylene diamine escaped through a cyclone (6), which had also been heated to 230° C., and after liquefaction in a condenser (8) kept at 100° C., was collected in a receiver (9) connected to a cooler (10) and a vacuum pump (11). The crude polyether collected in the receiver (7) had cooled to 172° C. through evaporation of the diamine and had an amine content of only 0.78% $NH_2$ (amine reduction 84.3%). Hydrogen chloride gas was introduced at 80° C. into the crude polyether continuously discharged from the receiver (7) and diluted with approximately the same quantity by weight of toluene until the amine salt had been completely precipitated. The amine hydrochloride was filtered off and washed with a little anhydrous toluene. The combined filtrates were then freed from toluene and excess hydrogen chloride in a vacuum evaporator (cf. FIG. 1).

A polyether having the following analytical data was obtained:

| | |
|---|---|
| Hydroxyl No. | 35.0 |
| Acid No. | 0.1 |
| $H_2O$ | 0.07% |
| $NH_2$ | 0.012% |
| pH | 6.2 |

EXAMPLE 2 (Comparison)

The procedure was the same as described in Example 1, except that 5% by weight of steam based on the quantity of hydrolysate, was additionally introduced as carrier gas through a throttle valve (4) (in accordance with German Offenlegungsschrift No. 2,755,089). After addition of the steam, the pressure prevailing at the end of the tubular coil evaporator, which originally amounted to 7 mbar, rose to 48 mbar. In addition, troublesome sublimation of tolylene diamine occurred in the vacuum pipe in contrast to the test procedure described in Example 1. The crude polyether collected in the receiver (7) still had an amine content of 1.52% $NH_2$ (amine reduction only 69.5%).

EXAMPLE 3

| (Foam formation from regenerated polyether) | |
|---|---|
| 100.0 | parts by weight of the regenerated polyether described in Example 1; |
| 3.2 | parts by weight of water; |
| 36.6 | parts by weight of tolylene diisocyanate (65/35); |
| 4.0 | parts by weight of difluor-dichlor-methane |
| 0.24 | part by weight of tin-di-octoate |
| 0.24 | part by weight of 1,4-diaza-2,2,2-bicyclo-octane and |
| 0.4 | part by weight of a dimethyl siloxan/polyethylene oxide-stabilizer | were mixed by means of a high-speed stirrer and the resulting mixture was poured into a 20×20 cm cardboard mold. A satisfactory foam having a uniform cell structure was obtained, being characterized by the following data in comparison with an original foam of pure polyether of the type used for producing the polyurethane foam of Example 1.

| | Regenerated Foam | Original Foam |
|---|---|---|
| Cream time (sec.) | 16.5 | 17.5 |
| Rise time (sec.) | 91 | 94 |
| Gross density (kg/m³) | 33.6 | 34.3 |
| Tensile strength (KPa) | 125 | 162 |
| Breaking elongation (%) | 200 | 287 |
| Compression hardness (KPa) | 4.7 | 4.6 |

EXAMPLE 4

(Comparison without tubular coil evaporation)

The hydrolysate, which had an amine content of 4.9% $NH_2$, was diluted directly, i.e., without preevaporation, with substantially the same quantity by weight of toluene, subsequently dehydrated by heating for 30 minutes in an azeotropic separator, followed by the introduction of gaseous hydrogen chloride at 80° C. until no more hydrochloride precipitated. The hydrochloride was filtered off and washed with a little anhydrous toluene. The combined filtrates were then freed from toluene and excess hydrogen chloride in a vacuum evaporator.

The polyether obtained produced the following analytical data:

| | |
|---|---|
| Hydroxyl No. | 37.2 |
| Acid No. | 1.6 |
| $H_2O$ | 0.06% |
| $NH_2$ | 0.37% |

The regenerate polyether could not be satisfactorily foamed in accordance with Example 3. A completely useless foam characterized by high shrinkage and an irregular pore structure was obtained.

EXAMPLE 5

(Process according to the invention using a high-boiling solvent)

Size-reduced waste of a standard commercial grade flexible polyurethane foam (according to Example 1) based on tolylene diisocyanate was continuously hydrolyzed in a screw extruder (Werner & Pfleiderer type ZDS KG 90) in accordance with German Offenlegungsschrift No. 2,442,387 at a throughput of (a) 40 kg/h, (b) 60 kg/h and (c) 80 kg/h. The hydrolysate, which left the screw extruder with a temperature of 210°–220° C. and an amine content of 4.92% $NH_2$, was expanded to around 50 mbar through a buffer vessel (1) (cf. FIG. 2), enabling excess steam and carbon dioxide to escape through a vent (2), and was continuously delivered by means of a pump (3) to a tubular coil evaporator (5) which had been heated to 230° C. and at the end of which a vacuum (11) of 7 mbar was applied.

At the same time, 5% by weight of ethylene glycol, based on the quantity of hydrolysate was sprayed into the tubular coil evaporator through a valve (4).

Below a cyclone, (6), which had also been heated to 230° C., crude, low-amine polyether (containing less than 1% by weight of $NH_2$) was collected in a receiver (7), while most of the tolylene diamine and all the ethylene glycol used escaped in vapor form via the head of the cyclone. In a column (12) tempered to 100°–120° C., liquid tolylene diamine which was collected in a receiver (13) was separated from vaporous ethylene glycol which was delivered to a receiver (9) through a following condenser (8).

The crude polyether collected in the receiver (7) had the following residual amine contents in dependence upon the throughput (see tests 5a, 5b, 5c in the Table on page 18).

All three crude polyether samples contained less than 1% by weight of $NH_2$ and could be directly subjected to quantitative amine hydrochloride precipitation. The same procedure carried out in the absence of ethylene glycol as high-boiling solvent gave the following results in regard to amine contents in the crude polyether (see tests 5a/1, 5b/1 and 5c/1 in the Table on page 19).

EXAMPLE 6

After dilution with substantially the same quantity by weight of toluene, hydrogen chloride gas was introduced at 80° C. into the combined crude polyethers (a) to (c) of Example 5 until precipitation of the amine salt was complete. The amine hydrochloride was filtered off and washed with a little anhydrous toluene. The combined filtrates were then freed from toluene and excess hydrogen chloride in a vacuum evaporator.

A satisfactorily foamable polyether having the following analytical data was obtained:

| | | | | |
|---|---|---|---|---|
| Hydroxyl No. | | 34.8 | | |
| Acid No. | | 0.21 | | |
| H₂O | | 0.02% | | |
| NH₂ | | 0.008% | | |
| pH | | 5.1 | | |

| Test | Throughput (kg/h) | Vacuum* (mbar) | Starting amine content (% NH₂) | Residual amine content (% NH₂) |
|---|---|---|---|---|
| 5a | 40 | 8 | 4.92 | 0.41 |
| 5b | 60 | 9 | 4.92 | 0.55 |
| 5c | 80 | 10 | 4.92 | 0.67 |
| Comparisons without the addition of ethylene glycol as carrier: (Tests 5a/1 to 5c/1) | | | | |
| 5a/1 | 40 | 7 | 4.98 | 0.78 |
| 5b/1 | 60 | 8 | 4.98 | 0.99 |
| 5c/1 | 80 | 9 | 4.98 | 1.00 |
| 7a | 40 | 9 | 4.99 | 0.42 |
| 7b | 60 | 9 | 4.99 | 0.61 |
| 7c | 80 | 10 | 4.99 | 0.74 |

*in tests 5a to c and 7a to c, after the introduction of glycol

| Test | Amine Reduction (%) |
|---|---|
| 5a | 91.7 |
| 5b | 88.8 |
| 5c | 86.4 |
| Comparisons without the additon of ethylene glycol as carrier: (Tests 5a/1 to 5c/1) | |
| 5a/1 | 84.3 |
| 5b/1 | 80.1 |
| 5c/1 | 80.0 |
| 7a | 91.6 |
| 7b | 87.8 |
| 7c | 85.2 |

EXAMPLE 7

The procedure was as described in Example 5, except that instead of ethylene glycol 5% by weight of diethylene glycol, based on the quantity of hydrolysate was sprayed into the tubular coil evaporator through the valve (4).

The crude polyether collected in the receiver (7) had the following residual amine contents in dependence upon the throughput (see tests 7a, 7b and 7c in the Table on page 18).

EXAMPLE 8

Size-reduced waste of non-yellowing flexible polyurethane foams based on a polyether obtained by the addition of ethylene oxide/propylene oxide (10:90) with a mixture of trimethylol propane and propylene glycol (85:15) and having an average molecular weight of 3100 and (a) isophorone diisocyanate, (b) hexamethylene diisocyanate and (c) 4,4'-dicyclohexyl methane diisocyanate were hydrolyzed in a screw extruder at throughputs of 40 kg/h in each case under the conditions specified in Example 5 and continuously delivered to a tubular coil evaporator after preliminary expansion to around 500 mbar. The operating conditions and separating effect of the tubular coil evaporator are shown in the Table on page 21. The crude polyether removed from the receiver (7) was freed from residual amine in accordance with Example 6. Satisfactorily foamable regenerated polyethers having the following analytical data were obtained:

| Test Conditions/Crude Polyether | | | |
|---|---|---|---|
| | Addition of | Operating Conditions (tubular coil/cycle) | |
| Test | ethylene glycol (%) | Vacuum (mbar) | Temperature (°C.) |
| 8a | 5 | 9 | 230 |
| 8b | — | 10 | 230 |
| 8c | 5 | 6 | 245 |

| Properties of the regenerated polyethers | | | |
|---|---|---|---|
| Test | Hydroxyl No. | Acid No. | NH₂ (%) |
| 8a | 48.5 | 0.5 | 0.02 |
| 8b | 45.0 | 0.2 | 0.01 |
| 8c | 46.3 | 0.2 | 0.02 |

| Test Conditions/Crude Polyether | | | |
|---|---|---|---|
| Test | Starting amine content (% NH₂) | Residual amine content (% NH₂) | Amine Reduction (%) |
| 8a | 5.0 | 0.47 | 90.6 |
| 8b | 5.3 | 0.31 | 94.2 |
| 8c | 4.9 | 0.89 | 81.8 |

| Properties of the regenerated polyethers | | | |
|---|---|---|---|
| Test | H₂O (%) | pH | Viscosity (mPa.s/80° C.) |
| 8a | 0.03 | 6.7 | 56.4 |
| 8b | 0.04 | 6.5 | 58.8 |
| 8c | 0.04 | 6.2 | 56.4 |

EXAMPLE 9

Waste of a cellular polyurethane elastomer based on (a) a polyether mixture having an average hydroxyl number of 30±3 and consisting of a linear, propyleneglycol-started polyether having an average molecular weight of 4000 and containing 80% of propylene glycol and 20% of ethylene glycol ether units and of a trifunctional, trimethylol propane-started polyether having an average molecular weight of 4800 and containing 85% of propylene glycol and 15% of ethylene glycol ether units, (b) 4,4'-diphenyl methane diisocyanate and (c) 1,4-butane diol were continuously hydrolyzed in a screw extruder (Werner & Pfleiderer type ZDS KG 90) in accordance with German Offenlegungsschrift No. 2,442,387 at a throughput of 30 kg/h. In addition to the starting polyethers, the thinly liquid hydrolysate leaving the screw extruder with a temperature of 250° C. contained 9.5% by weight of 1,4-butane diol and 24.7% by weight (corresponding to 3.99% of NH₂) of 4,4'-diaminodiphenyl methane. To remove readily volatile constituents (H₂O, CO₂), the hydrolysate was expanded to approximately 500 mbar via a buffer vessel (1) and was then continuously delivered to a tubular coil evaporator (5) which had been heated to 280° C. and at the end of which a vacuum of 1 mbar was applied. Most of the diaminodiphenyl methane and all the butane diol, which simultaneously acted as carrier gas, escaped via a cyclone which had also been heated to 280° C.

The diaminodiphenyl methane was condensed above its melting point in a heated receiver (13), while the butane diol was continuously separated off in a fractionating column (12) and delivered via a condenser (8) to a receiver (9).

The crude polyether mixture collected in the receiver (7) had a residual amine content of 0.98% NH₂, corresponding to an amine reduction of 75.4%.

The crude polyether was freed from residual amine in accordance with Example 6 and gave a recyclable regenerate polyether having the following analytical data:

| | |
|---|---|
| Hydroxyl No. | 33.56 |
| Acid No. | 0.2 |
| $NH_2$ | 0.007% |
| $H_2O$ | 0.03% |
| pH | 6.3 |
| Viscosity | 93.1 (80° C.) |

What is claimed is:

1. A process for separating polyether polyurethane hydrolysates obtained by hydrolysis of polyether polyurethanes into substantially amine-free foamable polyethers and diamines comprising:
   (a) expanding or treating in vacuo a hot polyether polyurethane hydrolysate in a manner such that any steam and carbon dioxide initially present may escape;
   (b) spraying said hydrolysate and optionally a high-boiling solvent directly into a tubular coil evaporator which evaporator is heated to 180°–300° C. and has a pressure of from 0.1 to 20 mbar applied at its end;
   (c) separating from said hydrolysate a first fraction made up of diamine and a second fraction containing less than 1% by weight of $NH_2$ in a cyclone;
   (d) collecting the first fraction in a receiving vessel and removing any solvent present therein by means of a distillation column to obtain substantially pure diamine;
   (e) introducing excess hydrogen chloride into the second fraction to precipitate as a hydrochloride any diamine present in the second fraction;
   (f) removing the precipitated hydrochloride from the second fraction by filtration; and
   (g) removing any solvent or excess hydrogen chloride present in the filtrate of step (f) by subjecting the filtrate to reduced pressure and thereby recovering an amine-free polyether.

2. The process of claim 1 wherein step (b) is conducted in the presence of from 1 to 15% by weight of a high boiling solvent, of which the boiling point is 50° to 150° C. below the boiling point of the diamine to be eliminated by evaporation and of which the vapor pressure at the condensation temperature of the diamine to be eliminated by evaporation does not exceed 10 times the operating pressure required in the evaporation unit.

3. A process as claimed in claim 1, characterized in that a pressure of from 1 to 10 mbars is applied at the end of the tubular coil evaporator.

4. A process as claimed in claim 1, characterized in that a high-boiling solvent of which the boiling point is 80° to 120° C. below the boiling point of the amine to be removed by evaporation and of which the vapor pressure at the condensation temperature of the amine to be removed by evaporation does not exceed twice the operating pressure required in the evaporation unit, is used in a quantity of from 3 to 6% by weight.

5. A process as claimed in claim 4, characterized in that the vapor mixture of diamine and high-boiling solvent separated off via a cyclone is continuously separated in a following distillation column without any further input of energy and that the solvent is returned to the process.

6. A process as claimed in claim 1, characterized in that the hydrolysate is introduced into a tubular coil evaporator which has been heated to 200°–250° C. and at the end of which a pressure of from 1 to 10 mbar is applied.

7. A process as claimed in claim 2, characterized in that ethylene glycol, diethylene glycol, 1,2-propylene glycol, trimethylene glycol, butane diol and aniline are used as high-boiling solvents.

8. A process as claimed in claim 1, characterized in that toluene is used as the inert solvent for precipitation of the diamine hydrochloride.

9. A process as claimed in claim 1, characterized in that polyurethane hydrolysates based on polyurethanes of polyethers and tolylene diisocyanate, diphenyl methane-2,4'- and/or -4,4'-diisocyanate, hexane-1,6-diisocyanate, dicyclohexyl methane diisocyanate or isophorone diisocyanate are used.

10. A process as claimed in claim 1, characterized in that polyurethane foam hydrolysates based on polyurethanes of polyethers and tolylene diisocyanate are used.

* * * * *